July 25, 1967  TSUNEO KOBAYASHI ET AL  3,333,128
MINIATURE SYNCHRONOUS MOTOR

Filed June 25, 1965  2 Sheets-Sheet 1

INVENTORS
Tsuneo Kobayashi
Yoshitaka Kanzaki
Koichi Yoshimura
Yoshio Yamamoto
BY Stevens, Davis, Miller & Mosher
ATTORNEYS

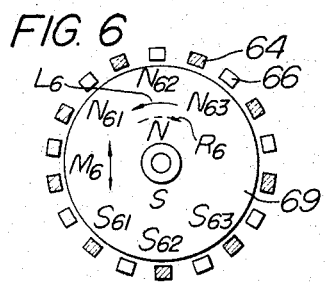
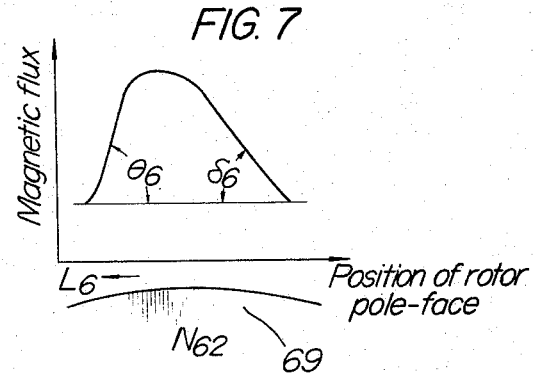
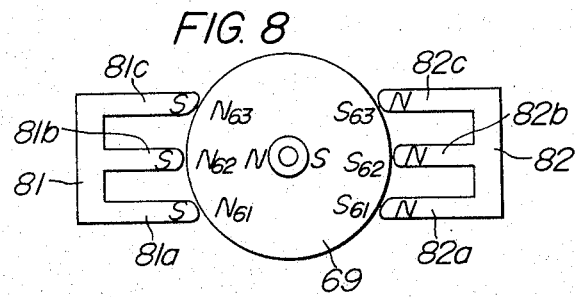
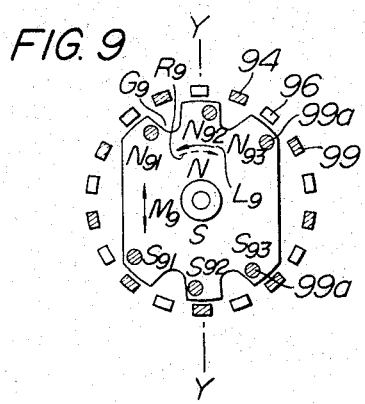
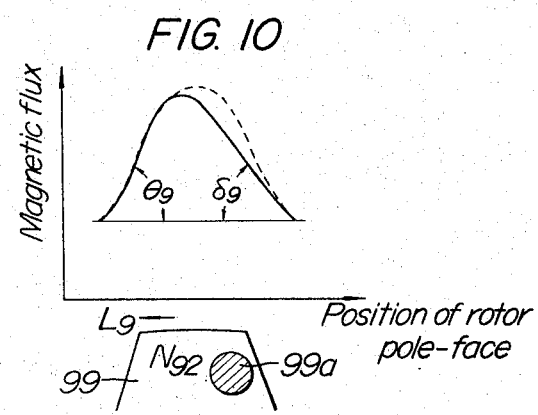

3,333,128
MINIATURE SYNCHRONOUS MOTOR

Tsuneo Kobayashi and Yoshitaka Kanzaki, Hirakata-shi, and Koichi Yoshimura and Yoshio Yamamoto, Kadoma-shi, Japan, assignors to Matsushita Electric Industrial Co. Ltd., Kadoma-shi, Osaka, Japan, a corporation of Japan
Filed June 25, 1965, Ser. No. 467,005
Claims priority, application Japan, June 29, 1964, 39/37,612, 39/37,613, 39/37,614
4 Claims. (Cl. 310—164)

This invention relates to miniature synchronous motors which are adapted to rotate in a predetermined fixed direction and more particularly to those adapted for incorporation in timers used, for example, with electric rice cooking-pots, electric washing machines, electric refrigerators, and kitchen equipment.

The primary object of the present invention is to provide a miniature synchronous motor of the type described which has a widened region of stable operation although it has the structure and shape similar to prior miniature synchronous motors of this type and no special work is applied thereto.

According to the present invention, there is provided a miniature synchronous motor which is adapted to rotate in a predetermined fixed direction, characterized in that magnetic flux is non-uniformly distributed on each pole-face of a permanent magnet rotor so that the magnetic flux is wavily distributed on the outer periphery of the permanent magnet rotor and attenuates from its maximum value at different rates on opposite sides of the maximum value thereof and the permanent magnet rotor is rotated in a direction in which the gradient of magnetic flux distribution makes a steep fall.

The above and other objects, advantages and features of the present invention will become obvious from the following description with reference to the accompanying drawings, in which:

FIG. 6 is a schematic plan view showing the arrangement of a stator relative to a permanent magnet rotor in another embodiment according to the present invention;

FIG. 7 is a graph showing a manner of magnetic flux distribution on one of pole-faces of the permanent magnet rotor of the miniature synchronous motor shown in FIG. 6;

FIG. 8 is an explanatory view showing a manner of magnetizing the permanent magnet rotor in the embodiment shown in FIG. 6;

FIG. 9 is a schematic plan view showing the arrangement of a stator relative to a permanent magnet rotor in still another embodiment according to the present invention; and FIG. 10 is a graph showing a manner of magnetic flux distribution on one of pole-faces of the permanent magnet rotor in the miniature synchronous motor shown in FIG. 9.

Figure 1:
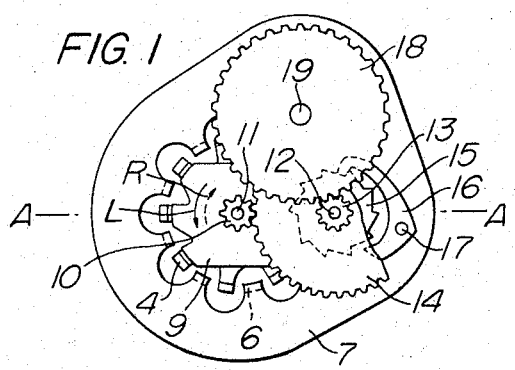
FIG. 1 is a plan view of an embodiment of the miniature synchronous motor according to the present invention.

Referring now to FIGS. 1 to 4, the miniature synchronous motor includes a cup-shaped outer casing 1 formed of a sheet of soft magnetic material such as iron. An iron core 2 is securely fixed at the center of inner bottom of the outer casing 1, and an annular field coil 3 is fixed between the inner peripheral face of the outer casing 1 and the outer peripheral face of the iron core 2. Securely mounted on the upper face of the iron core 2 is a stationary field plate 5 of soft magnetic material such as iron which is formed in a substantially circular shape and has a plurality of pole teeth 4 formed on its outer peripheral edge. Also securely mounted on the upper outer peripheral edge of the outer casing 1 is a stationary field plate 7 of soft magnetic material such as iron which is formed in a substantially annular shape and has a plurality of pole teeth 6 formed on its inner peripheral edge. These pole teeth 4 and 6 have a same pole width and are alternately arranged in equally spaced relation to form field poles as a whole.

Figure 3:
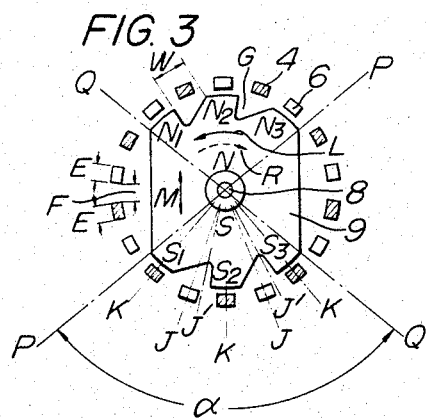
FIG. 3 is a schematic plan view showing the arrangement of a stator relative to a permanent magnet rotor in the miniature synchronous motor of FIG. 1.

At the center of the space defined by these field poles, a shaft 8 is rotatably supported in the iron core 2 and carries thereon a pinion 10. A permanent magnet plate rotor 9 and a ball 11 are secured to the pinion 10 as shown so that this permanent magnet rotor 9 can be rotated at synchronous speed. The permanent magnet plate rotor 9 is cut as by blanking from a plate of magnetic material such as cunico, cunife or vicalloy in a manner that the direction in which the plate is rolled coincides with the direction of magnetization, and has a shape as best shown in FIG. 3 in which an arrow M indicates the rolled direction, that is, the direction of magnetization. N and S poles are formed in the longitudinal direction along arrow M and are split into a plurality of sub-poles $N_1$, $N_2$, $N_3$ and $S_1$, $S_2$, $S_3$, respectively, by triangular cutouts G in a manner that these rotor sub-poles are opposed by the corresponding pole teeth 4 and 6 constituting the field poles. Or more precisely, the arrangement is such that the rotor sub-poles $S_1$, $S_2$ and $S_3$ are opposed by the corresponding pole teeth 4 when the sub-poles $N_1$, $N_2$ and $N_3$ take the position at which they are opposed by the corresponding pole teeth 6, and the rotor sub-poles $S_1$, $S_2$ and $S_3$ are opposed by the corresponding pole teeth 6 when the sub-poles $N_1$, $N_2$ and $N_3$ take the position at which they are opposed by the corresponding pole teeth 4.

Hereunder, the shape of the permanent magnet rotor 9 and dimensions of the sub-poles $N_1$, $N_2$, $N_3$, $S_1$, $S_2$ and $S_3$ of the rotor 9 relative to those of the pole teeth 4 and 6 will be described in further detail. According to the invention, the entire pole width of each of the N and S poles of the permanent magnet rotor 9 makes an angle $\alpha$ with respect to the central shaft 8, which angle is equal to an angle which is defined by lines P—P and Q—Q passing the center of the shaft 8. In the position of the permanent magnet rotor 9 relative to the pole teeth 4 and 6 as shown in FIG. 3, the line P—P is shown as passing between the pole tooth 4 opposite the south sub-pole $S_1$ and the adjacent pole tooth 6 disposed externally thereof, passing through the center of the shaft 8 and passing between the pole tooth 6 opposite the north sub-pole $N_3$ and the adjacent pole tooth 4 disposed externally thereof, while the line Q—Q is shown as passing between the pole tooth 4 opposite the south sub-pole $S_3$ and the adjacent pole tooth 6 disposed externally thereof, passing through the center of the shaft 8 and passing between the pole tooth 6 opposite the north sub-pole $N_1$ and the adjacent pole tooth 4 disposed externally thereof. Further, open end edges of each cutout G have a width W which is equal to the sum of a width E of each pole tooth 4 or 6 and a gap width F between the pole teeth 4 and 6. A line J passing through the center of the opening of each cutout G of the permanent magnet rotor 9 lies exactly intermediate between center lines K and K' of the adjacent sub-poles disposed on both sides of the cutout G, and a line J' passing the bottom of each cutout G is biased in the same direction with respect to each center line J described above.

The magnetic flux produced by the supply of current through the field coil 3 passes a magnetic path consisting of the iron core 2—pole tooth 4—gap-pole tooth 6—outer casing 1—iron core 2.

A pivot 12 is securely fixed on the stationary field plate 7 and rotatably supports thereon a pinion 13. A gear 14 and an escape wheel 15 are fixed on the pinion 13. The gear 14 is in meshing engagement with the pinion 10, while the escape wheel 15 is in meshing engagement with an anchor 16 which is supported on the stationary field plate 7 so as to be pivotal about a pin 17. A gear 18 is fixedly mounted on a power take-off shaft 19 and is in meshing engagement with the pinion 13.

When now the permanent magnet rotor 9 rotates counter-clockwise as shown by arrow L, the pinion 10 also rotates counter-clockwise to cause clockwise rotation of the gear 14 and the escape wheel 15 because the pinion 10 is in meshing engagement with the gear 14 to which the escape wheel 15 is coaxially fixed. As a result, the escape wheel 15 urges the anchor 16 outwardly during its clockwise rotation and can freely rotate without any resistance thereto. In case however the permanent magnet rotor 9 rotates clockwise as shown by arrow R, the escape wheel 15 tends to rotate counter-clockwise but cannot rotate by being locked by the claw of the anchor 16. Therefore the permanent magnet rotor 9 can rotate in only one direction or counter-clockwise.

Figure 4:
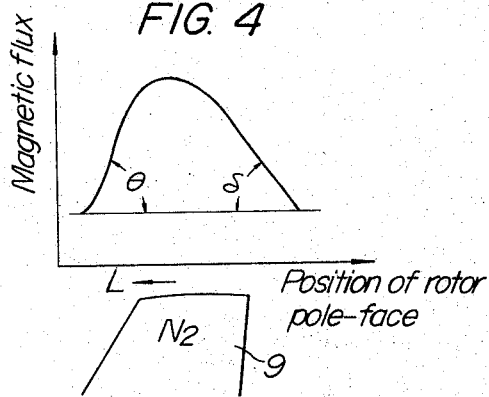
FIG. 4 is a graph showing a manner of magnetic flux distribution on one of pole-faces of the permanent magnet rotor of the miniature synchronous motor shown in FIG. 1.

From the above description it will be understood that, in the miniature synchronous motor of the present invention, the bottom of each cutout G of the permanent magnet rotor 9 is biased in the same direction with respect to the center of the opening of the cutout G so that the sub-poles in sawtooth-like form are provided on the permanent magnet rotor 9. This structure provides an advantage in that starting torque is increased to effect positive and easy self-starting. In addition to the above, an advantage such as an increased output results from the enlargement of the entire pole width (corresponding to the angle $\alpha$) and the width W of the cutouts G of the permanent magnet rotor 9. Further, asymmetry of the shape of each sub-pole of the permanent magnet rotor 9 with respect to its center line K brings forth an unbalance in the magnetic flux distribution on the pole-face of each sub-pole of the permanent magnet rotor 9 as shown in FIG. 4. For each of the sub-poles $N_1$, $N_2$, $N_3$, $S_1$, $S_2$ and $S_3$ of the permanent magnet rotor 9, the magnetic flux distribution thereon is wavy and the magnetic flux decreases towards the opposite ends of each sub-pole from its maximum value. As shown in the curve of FIG. 4, the magnetic flux distribution in the left-hand side half of each sub-pole of the permanent magnet rotor 9 changes at a rate different from that of the right-hand side half thereof, and their angles of inclination are $\theta$ in the left-hand side half of each sub-pole and $\delta$ in the right-hand side half thereof. In the embodiment presently described, $\theta > \delta$.

Figure 5:
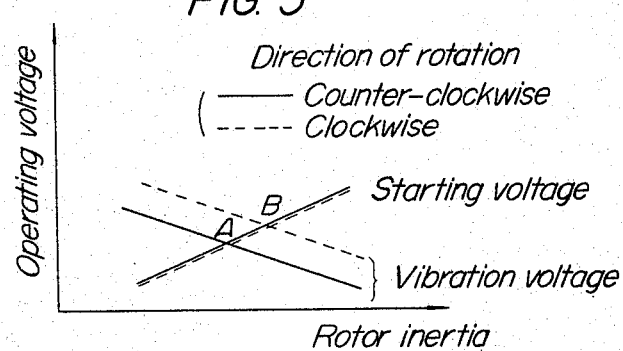
FIG. 5 is a graph showing the operating characteristics of the miniature synchronous motor of FIG. 1.

Due to the fact that the gradient of magnetic flux distribution on the pole-face of each of the sub-poles $N_1$, $N_2$, $N_3$, $S_1$, $S_2$ and $S_3$ of the permanent magnet rotor 9 differs at the left-hand side and the right-hand side of each sub-pole as described above, it was observed that the electric motor exhibits different performances depending on the direction of rotation of the permanent magnet rotor 9 when the source voltage for the motor is in its low voltage region. FIG. 5 shows such different performances of the electric motor depending on the direction of rotation of the permanent magnet rotor 9. FIG. 5 graphically illustrates how starting voltage changes when the inertia of the permanent magnet rotor 9 is varied and how vibration voltage changes at which the permanent magnet rotor 9 causes vibration. As will be apparent from FIG. 5, there is no appreciable difference between starting voltages due to different directions of rotation of the permanent magnet rotor 9 and the starting voltages in both cases make a rise as the inertia of the permanent magnet rotor 9 increases. However, vibration voltage of the electric motor, that is, a voltage at which the permanent magnet rotor 9 develops vibration when power is supplied to the motor and the rotor 9 cannot get out of such objectionable operating condition is reduced in each direction of rotation as the inertia of the permanent magnet rotor 9 increases, though there is a marked difference between the vibration voltages due to different directions of rotation of the permanent magnet rotor 9. In a miniature synchronous motor as described above which is rated at an output of the order of 16 mw., for example, different directions of rotation of the permanent magnet rotor 9 result in a difference between the vibration voltages of the order of 10 to 20 volts.

In a miniature synchronous motor, especially a timing motor, which must have the widest possible stable operation range in view of durability and mass production, it is important to attain the enlargement of the width of stable operation range in a low voltage region. An upper limit voltage at which the motor can operate stably with power supply at high voltage may somewhat vary depending upon the direction of rotation of the permanent magnet rotor if the inertia of the permanent magnet rotor is very small. However, at somewhat greater inertia of the permanent magnet rotor, different directions of rotation of the permanent magnet rotor do not cause any difference between the upper limit voltages at which the motor can stably operate. As a matter of practical use, therefore, no special consideration need be given to the width of stable operation range in a high voltage region due to different directions of rotation of the permanent magnet rotor.

In the embodiment described above, the vibration voltage of the motor in a low voltage region is low when the permanent magnet rotor 9 rotates counter-clockwise as shown by arrow L in FIG. 3 and high when the rotor 9 rotates clockwise as shown by arrow R. In other words, the permanent magnet rotor 9 can easily be placed in its rotating state even at a low voltage when it is rotated in a direction in which the gradient of magnetic flux distribution on the pole-face of each sub-pole makes a steep fall as shown in FIG. 4, that is, the direction in which the angle of inclination $\theta$ exists. The reason for this ease of rotation of the permanent magnet rotor 9 in the direction in which the steep fall of the magnetic flux distribution gradient exists will be considered. Output torque (effective torque) as an electric motor is developed when the gradient of magnetic flux distribution on each sub-pole of the permanent magnet rotor is positive with respect to the angle of rotation of the rotor, and constraining torque (unavailable torque) is developed when the gradient of magnetic flux distribution is negative with respect to the angle of rotation of the permanent magnet rotor, thus the magnitude of torque depends on the magnitude of the gradient of magnetic flux distribution. It is thus considered that large output torque and small constraining torque are caused by low vibration voltage when the permanent magnet rotor is rotated in the direction in which the gradient of magnetic flux distribution on the pole-face of each sub-pole of the rotor shows a steep fall, while small output torque and large constraining torque are caused by high vibration voltage when the permanent magnet rotor is rotated in a direction opposite to the above, and consequently the different directions of rotation of the permanent magnet rotor bring forth a marked difference between motor vibration voltages.

It will be known that in the embodiment of the present invention described above, the shape of the permanent magnet rotor 9 is geometrically deformed so that the magnetic flux distribution on the pole-face of each sub-pole of the permanent magnet rotor 9 is unbalanced as between the left-hand side half and the right-hand side half of each sub-pole and the anti-reversing mechanism consisting of the escape wheel 15 and the anchor 16 is provided to limit the rotation of the permanent magnet rotor 9 in only one direction, that is, the direction of arrow L in which the gradient of magnetic flux distribution on each sub-pole makes a steep fall.

Referring next to FIGS. 6 and 7, another embodiment of the present invention will be described. This embodiment is provided with an anti-reversing mechanism including an escape wheel and an anchor and stator portions which are similar to those shown in FIGS. 1 to 3. Therefore no detailed description will be given herein with regard to those portions. The miniature synchronous motor in this embodiment includes pole teeth 64 and 66 constituting stationary field poles and a permanent magnet rotor 69 of discoidal shape formed of magnetic material such as a ferrite magnet or E.S.D. magnet. The permanent magnet rotor 69 is magnetized in a direction along arrow $M_6$ to provide N and S poles thereon. The N and S poles are divided into respective sub-poles $N_{61}$, $N_{62}$, $N_{63}$ and $S_{61}$, $S_{62}$, $S_{63}$.

Magnetic flux on the pole-face of each sub-pole of the permanent magnet rotor 69 is distributed in an unbalanced wavy form as shown in FIG. 7. The magnetic flux distribution is maximum at the central portion of each sub-pole and decreases towards opposite ends of each sub-pole, while that section of each sub-pole lying on the left-hand side of the maximum magnetic flux portion has a gradient of magnetic flux distribution different from that of the right-hand side section. In this embodiment, respective angles of inclination are $\theta_6$ and $\delta_6$ with $\theta_6 > \delta_6$. A preferred method for providing the sub-poles $N_{61}$, $N_{62}$, $N_{63}$, $S_{61}$, $S_{62}$ and $S_{63}$ on the permanent magnet rotor 69 so that they have the magnetic flux distribution as shown in FIG. 7 will be described with reference to FIG. 8. According to this method, a magnetizing iron core 81 formed with magnetizing pole teeth 81a, 81b and 81c and a similar magnetizing iron core 82 formed with magnetizing pole teeth 82a, 82b and 82c are disposed in a manner that the pole teeth of the former are opposed by the corresponding pole teeth of the latter and the discoidal permanent magnet rotor 69 is held between the respective pole teeth as shown. Then the magnetizing iron cores 81 and 82 are energized to south polarity and north polarity, respectively, to provide the sub-poles $N_{61}$, $N_{62}$, $N_{63}$, $S_{61}$, $S_{62}$ and $S_{63}$ on the permanent magnet rotor 69. Each of the magnetizing pole teeth 81a, 81b, 81c, 82a, 82b and 82c is so shaped that it abuts the permanent magnet rotor 69 at its central portion and is successively receded towards opposite end edges thereof in order that a successively greater gap can be provided between the permanent magnet rotor 69 and each magnetizing pole tooth at each side of its central portion. Further it is so arranged that the spacing of the gap (gap inclination) on the left-hand side (facing the permanent magnet rotor 69) of the center of each magnetizing pole tooth is different from the spacing of the gap (gap inclination) on the right-hand side of the center of said pole tooth in order to magnetize the pole-faces of the sub-poles $N_{61}$, $N_{62}$, $N_{63}$, $S_{61}$, $S_{62}$ and $S_{63}$ in a manner that they have the magnetic flux distribution as shown in FIG. 7.

Figure 2:
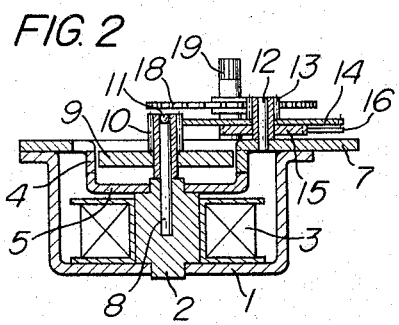
FIG. 2 is a section taken on line A—A in FIG. 1.

In the just-described embodiment of the invention, an anti-reversing mechanism including an escape wheel and an anchor as shown in FIGS. 1 and 2 is likewise operatively associated with the permanent magnet rotor 69 shown in FIG. 6 to cause rotation of the permanent magnet rotor 69 in the direction of arrow $L_6$, that is, in the direction in which the gradient of magnetic flux distribution on the pole-face of each of the sub-poles $N_{61}$, $N_{62}$, $N_{63}$, $S_{61}$, $S_{62}$ and $S_{63}$ makes a steep fall. By virtue of this arrangement, the electric motor has an enlarged range of stable operation and can easily be placed in its rotating state even at a low voltage, as described in detail previously.

FIGS. 9 and 10 show still another embodiment of the present invention. This embodiment also employs an anti-reversing mechanism including an escape wheel and an anchor and stator portions similar to those as shown in FIGS. 1 to 3 and therefore no detailed description with regard to these portions will be given herein. According to this embodiment, a different material is embedded in a permanent magnet rotor so that magnetic flux distribution on the pole-face of each sub-pole of the permanent magnet rotor has different gradients at the left-hand side section and the right-hand side section of each sub-pole, and the permanent magnet rotor is rotated in a direction in which the gradient of magnetic flux distribution makes a steep fall.

Or more precisely, the electric motor of this embodiment includes pole teeth 94 and 96 constituting field poles and a permanent magnet rotor 99 which is fabricated as by blanking from a plate of magnetic material in a manner that the direction in which the plate is rolled coincides with the direction of magnetization and has a shape as shown in FIG. 9. N and S poles are provided in a direction of arrow $M_9$, that is, in the direction of rolling, and are split into a plurality of sub-poles $N_{91}$, $N_{92}$, $N_{93}$ and $S_{91}$, $S_{92}$ and $S_{93}$, respectively, by L-shaped cutouts $G_9$. These sub-poles are opposed by the corresponding pole teeth 94 and 96 constituting the field poles. A material having magnetic properties different from those of the permanent magnet rotor 99 is embedded in each sub-pole as at 99a. By the presence of such embedment 99a of different material, the pole-face of each sub-pole of the permanent magnet rotor 99 shows magnetic flux distribution as shown in FIG. 10, from which it will be known that the magnetic flux distribution is maximum at the central portion of each of the sub-poles $N_{91}$, $N_{92}$, $N_{93}$, $S_{91}$, $S_{92}$ and $S_{93}$ and decreases towards opposite ends of each sub-pole. Further, that section of each sub-pole lying on the left-hand side of the central portion has a gradient of magnetic flux distribution different from that of the right-hand side section thereof, and respective angles of inclination are $\theta_9$ and $\delta_9$ with $\theta_9 > \delta_9$. In the present embodiment, the center of the opening of each cutout $G_9$ aligns with the center of the bottom thereof and the shape of the permanent magnet rotor 99 is symmetrical with respect to line Y—Y.

In the just-described embodiment of the present invention, an anti-reversing mechanism including an escape wheel and an anchor as shown in FIGS. 1 and 2 is operatively associated with the permanent magnet rotor shown in FIG. 9 to cause rotation of the permanent magnet rotor 99 in the direction of arrow $L_9$, that is, in the direction in which the gradient of magnetic flux distribution on the pole-face of each of the sub-poles $N_{91}$, $N_{92}$, $N_{93}$, $S_{91}$, $S_{92}$ and $S_{93}$ makes a steep fall. By virtue of this arrangement, the electric motor has an enlarged range of stable operation and can easily be placed in its rotation even at a low voltage.

Any other available means may be employed to vary the internal structure of the permanent magnet rotor in order to give unbalanced magnetic flux distribution on the left-hand side section and the right-hand side section of each sub-pole of the permanent magnet rotor. Such means may include a method of applying impact or pressure to that portion of the permanent magnet rotor to which different magnetic properties are to be imparted whereby that portion may be subjected to distortion and has its magnetic properties degraded compared with the remaining rotor portions, or a method of bringing an electrode into contact with the permanent rotor and supplying current to a portion of the permanent magnet rotor to generate Joule heat thereat whereby that portion is subjected to thermal distortion or to thermal transformation and has its magnetic properties changed.

In the embodiments described above, a mechanical anti-reversing mechanism including an escape wheel and an anchor is employed as a means for causing rotation of the permanent magnet rotor in a predetermined direction, that is, in a direction in which the gradient of magnetic flux distribution on each sub-pole of the permanent magnet rotor makes a steep fall. However, any other mechanical anti-reversing means well known in the art may be employed in lieu of the above mechanism or electrical means may be employed so that the direction of rotating magnetic field generated by the field poles coincides with the desired direction of rotation of the rotor.

From the foregoing description it will be understood that, in the miniature synchronous motor according to the present invention, magnetic flux is distributed in a wavy manner on the outer periphery of a permanent magnet rotor and attenuates from its maximum value at different rates on opposite sides of the maximum value hereof and means for causing the rotation of the permanent magnet rotor in a single direction is provided to rotate the rotor in a direction in which the gradient of magnetic flux distribution makes a steep fall. By virtue of the above features, the electric motor according to the invention has an enlarged range of stable operation and can easily and positively be placed in its stable rotation.

What is claimed is:

1. A miniature synchronous motor comprising field poles arranged in a circuit, and a permanent magnet rotor having its poles arranged opposite said field poles, said permanent magnet rotor having means provided thereon so that magnetic flux is distributed in a wavy manner on the outer peripheral pole-face of each of said rotor poles and attenuates from its maximum value at different rates on opposite sides of the maximum value thereof, and said permanent magnet rotor being rotated in a direction in which the gradient of magnetic flux distribution makes a steep fall.

2. A miniature synchronous motor according to claim 1, in which each of said poles of said permanent magnet rotor is shaped asymmetrically with respect to its center line so that the magnetic flux is distributed in a wavy manner on its outer peripheral pole-face and attenuates from its maximum value at different rates on opposite sides of the maximum value thereof, and said permanent magnet rotor is rotated in a direction in which the gradient of magnetic flux distribution makes a steep fall.

3. A miniature synchronous motor according to claim 1, in which each of said poles of said permanent magnet rotor is so magnetized that the magnetic flux is distributed in a wavy manner on its outer peripheral pole-face and attenuates from its maximum value at different rates on opposite sides of the maximum value thereof, and said permanent magnet rotor is rotated in a direction in which the gradient of magnetic flux distribution makes a steep fall.

4. A miniature synchronous motor according to claim 1, in which each of said poles of said permanent magnet rotor has its internal structure partly changed from the remaining portion so that the magnetic flux is distributed in a wavy manner on its outer peripheral pole-face and attenuates from its maximum value at different rates on opposite sides of the maximum value thereof, and said permanent magnet rotor is rotated in a direction in which the gradient of magnetic flux distribution makes a steep fall.

No references cited.

MILTON O. HIRSHFIELD, *Primary Examiner.*

L. L. SMITH, *Assistant Examiner.*